Oct. 9, 1923. 1,470,548
G. J. SPOHRER
ELECTRIC MOTOR DRIVEN COMPRESSOR
Filed June 28, 1921
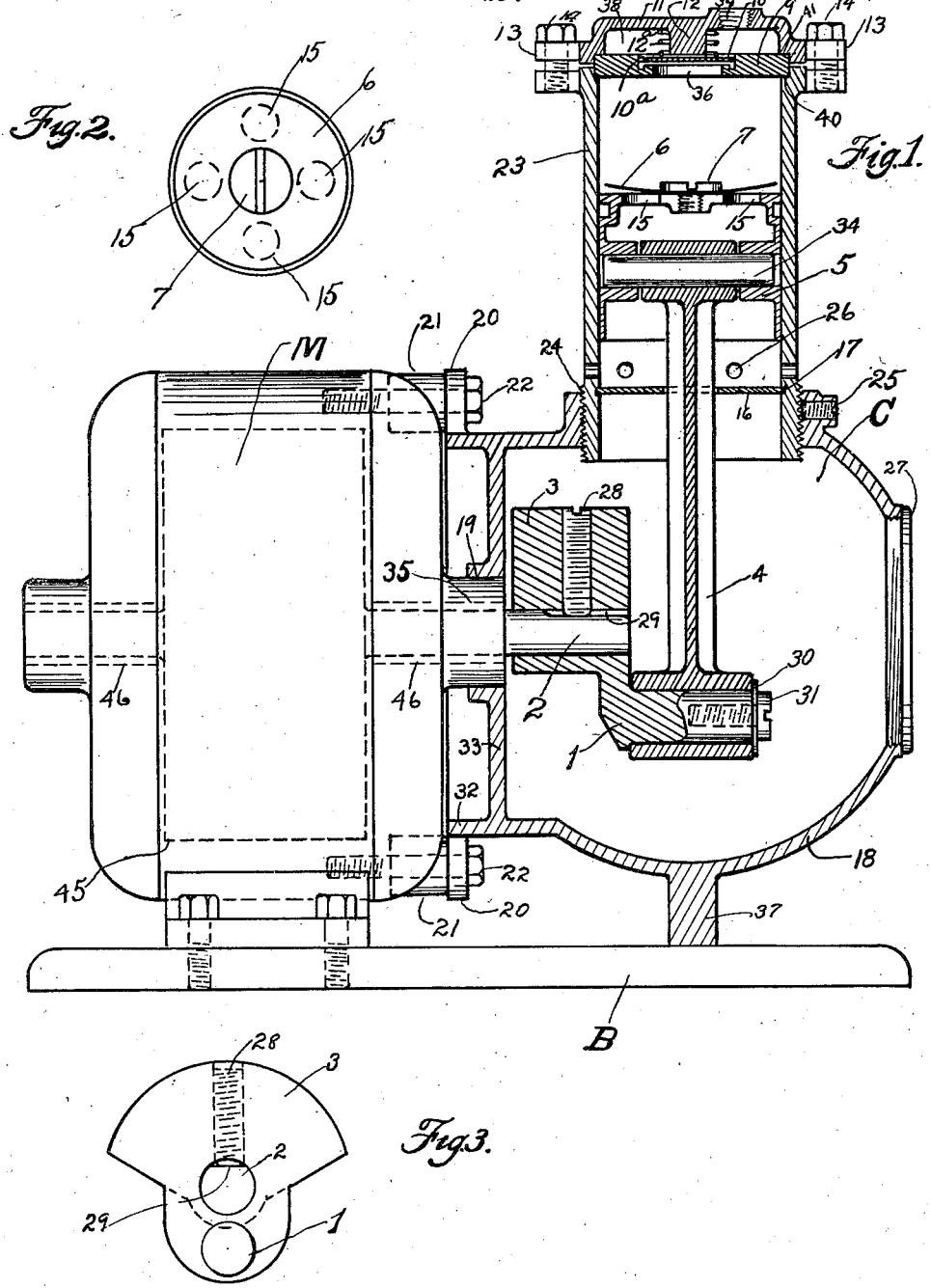
WITNESSES
Albert Hruba
Louis Stahl
INVENTOR
Gregory J. Spohrer Patented Oct. 9, 1923.

1,470,548

UNITED STATES PATENT OFFICE.

GREGORY JOHN SPOHRER, OF EAST ORANGE, NEW JERSEY.

ELECTRIC MOTOR-DRIVEN COMPRESSOR.

Application filed June 28, 1921. Serial No. 480,952.

*To all whom it may concern:*

Be it known that I, GREGORY JOHN SPOHRER, a citizen of the United States, residing at East Orange, in the county of Essex and the State of New Jersey, have invented a new and useful Electric Motor-Driven Compressor, of which the following is a specification.

My invention relates chiefly to garage compressors for storing air for various purposes and for tire inflation, although the apparatus herein later described, may obviously be used in compressing air for various purposes and gases other than air, which are supplied under pressure.

Standard practice with compressors, in order to operate efficiently requires comparatively large and slow speed machines for a given capacity or much slower than the electric motors available to drive them. Standard electric motors, in order to meet the requirements commercially and practically are built to run at high speed due to the lower material requirement, size and cost as compared with slow speed machines. The present day practice in electric driven garage compressors is to use a slow speed compressor of low revolutions per minute, coupled through a reducing train of gears or belt and fly wheel to a high speed motor. This practise of using reducing gearing has been followed generally, due to the fact that low speed electric motors suitable for the compressors and at the same speed are too large and expensive for commercial use, also that compressors have not been built to operate efficiently at the high speed of the commercial, high speed electric motors. Obviously a compressor that functions efficiently at the same high revolutions per minute as the commercial high speed electric motors and connected directly to the electric motor armature shaft provides a compressor outfit with less wearing parts, more compact and with much less material, labor and expense. A serious obstacle encountered heretofore in building compressors to function efficiently at the high speed of commercial efficient electric motors has been due to the lack of a simple, suitable valve action to function for the intake of air at the high speeds, the commercial compressor being undesirable, also due to the greatly reduced size which for a given capacity as compared with large slow speed compressors, whereby the clearance would figure against the higher speed machine and its efficiency.

The objects of my improvements are first, to provide an intake valve that will be sensitively responsive to the intake and compression strokes of the piston and function efficiently at the high piston speed by virtue of the inherent qualities of said valve; second, to provide a means of adjustment for eliminating clearance, and third, to promote a combination of parts to make possible a high speed compressor that will function efficiently at the same speed as high speed commercial electric motors; as well as to provide a means of coupling the compressor directly to the motor shaft with few parts, having but slight inertia to be overcome by the electric motors, and to obtain an organism of the indicated character, in which the motor bearings contribute materially to the compressor support and take the thrusts coincident to the operation of the compressor.

Further objects and advantages of my invention will be apparent, as it is better understood by reference to the following specifications when read in connection with the accompanying drawings illustrating the preferred embodiment of the invention in which:—

Fig. 1 shows a sectional view through the center of the compressor showing it attached directly to an electric motor of conventional type and mounted on base;

Fig. 2 shows a top view of the piston and the intake valve and ports;

Fig. 3 shows an end view of the counter-balanced crank member.

Referring to the drawing, 18 is a shell or casing advantageously partially rounded which adapts the compressor to attachment on the electric motor M by means of the hole in end of plate 33 of casing 18, centralizing the compressor on the motor hub 35 at 19. And the compressor is secured to motor M, by the screws 22 binding the ears 20, of casing 18, securely against the collars 21, that act as spacers between the electric motor and ears 20. The flange 32 of casing 18 will vary in shape and appearance suitable for various motors.

An end cap 27 on casing 18 is supplied to facilitate assembly, also to oil and examine compressor.

The electric motor M is of a conventional and commercial type and is controlled by conventional switches, or means well known to the art that is unnecessary to be shown here.

Motor M is secured to base B and support 37 of casing 18 rests on same.

The cylinder 23 of the compressor, in practice is threaded on one end to screw into casing 18 at 24 and is secured at any position of height within the range of threads 24 by screw 25, this providing a means of adjustment to eliminate all space or clearance between the cylinder head 9 and piston head 5 when the piston is at top center.

A series of holes as at 26 in cylinder 23 is to maintain atmospheric pressure at all times within casing 18 and that part of cylinder below piston head. The periphery of cylinder head 9 fits snugly in the recessed top end of cylinder 23 and the bottom end of cylinder cap 11 and is clamped air tight between the recessed shoulders 40 and 41, by screws 14 in ears 13 of cylinder 23 and cap 11. The discharge chamber 38 is formed between head 9 and cap 11 and the threaded hole 34 provides for the connection of a suitable means to convey the compressed air for use. Air passes from cylinder 23 to discharge chamber 38 and connection 34 through an ample outlet 36 in head 9, said outlet 36 being controlled by a spring-pressed valve or check valve 10.

An oil baffle washer 16 is disposed in cylinder 23 at the back of piston head 5 is made to spring outward into annular groove 17 and has a rectangular hole to provide clearing action of connecting rod 4.

A crank member 1 is provided on the motor shaft 2 for connecting rod 4 and has a counter balanced portion 3 which is sufficient in weight to counter-balance all the reciprocating and revolving parts of the compressor. Crank member 1 has a bored hole and by this means is mounted snugly on a shaft 2 of the electric motor and is kept from revolving and secured thereto by the flat 29 on shaft 2 and setscrew 28.

Thus the crank member 1 and electric motor shaft are rigid as one piece and by this arrangement the electric motor shaft 2 functions as the compressor's crankshaft, the electric motor bearings 46 for shaft 2 function as the compressor crankshaft bearing and the armature 45 of the electric motor functions as the fly wheel for the compressor.

Connecting rod 4 of a conventional type links the crank 1 with a wrist pin 34 of piston 5.

The intake valve 6 is a thin, flat, metal, flexible disc of a slightly less diameter than piston 5 and is secured firmly under head of screw 7 to top of piston 5 and possessing pliancy at all degrees and radii of its two surfaces, also a tendency to remain flat, having no perceptible inertia, in deflecting or when seated. Only that part of valve that projects from under screw head 7 is responsive to deflection.

Intake valve 6 differs from other valves known to the art and is peculiarly adapted to high speed, due to the fact that it is clamped securely against part of the plane surface upon which it operates, requires no springs, guides or stops in functioning, hence no parts to wear; it functions by flutteringly uncovering and covering positively the port holes 15 in response to the pressure existing against its surfaces. Due to its relatively large area to the full area of the piston and lack of inertia, it offers more sensitive response to cylinder intake conditions, also more port area is available for use with this valve. Accordingly, the space required for incorporating the valve in compressor construction is negligible as compared with conventional valves and makes possible efficient high speed compressors when combined with the other novel features above described.

In operation the conventional electric motor M is controlled by any conventional means to stop and start, as the shaft revolves, due to the crank action and through connecting rod 4, a reciprocating action is conveyed to piston 5 causing an intake of air into the cylinder from under the outer periphery of valve 6, on the downward stroke as the piston reaches bottom of travel, valve 6, which is shown open in drawing, closes, covering ports 15, then on the upward stroke discharge valve 10 is unseated against the pressure of a spring 12$^a$ coiled about stud 12 depending from cap 11 and the compressed air passes around the interrupted outer edge 10$^a$ of valve 10 which is a conventional valve, into discharge chamber 38 and out through opening 34. As this cycle of operations continues at high speed the armature 45 of electric motor M, due to shaft 2 being the crank-shaft of the compressor, absorbs the impulsive or irregular stresses and acts as a fly wheel and the electric motor bearings function also as the compressor crankshaft bearings.

Accordingly, with the means shown to connect the compressor so closely with the electric motor and to utilize the armature 45 of the electric motor to function as a fly wheel to the compressor, also the armature shaft 2 and bearings 46 as crankshaft and bearings to the compressor and with the counter-balanced crank member 1 to balance the off center and reciprocating parts, and an intake valve that functions efficiently, it is obvious why a smooth running efficient high speed compressor is attained.

A compressor pump operating at high speed and directly responsive to a high speed commercial electric motor has never been produced before to my knowledge; nor did there exist prior to my invention a motor and pump assemblage that could be utilized to produce a high speed pump responding to the speed of a high speed commercial motor. My improved compressor pump is operated at from 1750 to 2000 revolutions per minute, and accordingly develops a high efficiency in actual practice, whereas the ordinary compressor pump cannot develop speed above 650 revolutions per minute. Important in carrying out my invention are three conditions that I have brought about, to wit; (1) The construction is such as practically to prevent, and at all events to minimize, the setting up of vibrations in the pump assemblage; (2) I prevent any vibrations incident to the operation of the pump from destroying the proper motor conditions; and (3) those elements of the motor which tend to centralize or keep the rotor of the motor within the magnetic field are preserved intact and undisturbed in providing pump means for developing the high speed pressure action.

Specifically, the new and important results obtained by me are due to the fact that I have produced an assemblage in which the motor bearings remain undisturbed and are made to constitute the thrust bearings for the compressor pump and thereby the high speed developed in the compressor in no way affects the motor conditions.

A device of this character, for any given capacity as compared with the usual electric driven compressors, would be very much less in size, weight, and material, and involve fewer parts and reduced cost of production.

While, I have shown and described and pointed out in the annexed claims, certain novel features of my invention, it will be understood that various omissions, substitutions and changes in the form and detail of the device illustrated and in its operation may be made by those skilled in the art without departing from the spirit of the invention.

Having thus described my invention, I claim:—

1. In a device of the class described, the combination with an electric motor, of an air compressor having a casing fashioned to centralize with and provided with means to secure it to an end of the motor, a cylinder adjustably secured to and with one end open to the interior of said casing, the shaft of said motor projecting into said casing of the cylinder at right angles to the axis of said cylinder, a crank member on said shaft within said casing, a counter-balance on the shaft between the crank and the motor, and a piston within the cylinder and linked to said crank member.

2. In a device of the class described, the combination with an electric motor, of an air compressor comprising a casing fashioned to centralize with and having means to secure said casing to said motor, the electric motor shaft projecting into the interior of said casing, a counter-balanced crank pin detachably mounted on said shaft and of greater radius than the shaft, a connecting rod having at one end a bearing mounted to surround the crank pin, the other end extending through an opening in said casing, a wrist pin to which said other end of said connecting rod is connected, a piston with which said wrist pin is associated, and a cylinder in which said piston operates, said cylinder being open at one end to said casing.

3. The combination with an electric motor, and an air compressor mounted and secured on one end of said motor, said compressor comprising a cylinder having a casing at an end thereon, and a piston in said cylinder, the armature drive shaft of the motor extending into said casing, and drive connections between said shaft and said piston and so arranged that bearing of the electric motor adjacent the compressor functions as the compressor bearing.

4. The combination with a commercial high-speed electric motor having a casing extending about the ends and having bearings at said ends of the motor shaft, said shaft at one end extending beyond the adjacent casing end and beyond the motor bearings at said end: of a compressor comprising a cylinder, and a reciprocating piston, a casing extension integral with said cylinder in which casing extension said shaft extension is disposed, said casing extension at a side thereof being set against the face of the adjacent end of the motor casing, and a drive connection between said shaft extension and said piston and directly responsve to the high speed of said motor.

5. In a device of the class described, the combination of a commercial high speed electric motor, and a compressor including a mechanism containing casing provided with projections adapting said casing to be secured to an end of the electric motor, a cylinder mounted at one end and open to the interior of said casing, a piston in said cylinder, the electric motor shaft projecting at one end beyond the motor bearing at said end into said casing of the compressor at right angles to the axis of the cylinder, and a counter-balanced crank detachably received on the projecting end of said electric motor shaft within said casing.

6. In an electric driven compressor assemblage of the class described, the combination of an electric motor, a compressor cylinder having a casing directly attached to an end of said motor, the armature drive shaft of said motor at one end extending beyond the adjacent bearing of the motor into said casing so that the ordinary adjacent bearing on the motor takes the thrust of the operative compressor parts and having a counter-balanced drive member adapted to describe a path beyond the peripheral limits of said shaft, and means to transmit a reciprocating motion to the piston from said drive member.

7. The combination of a commercial high-speed electric motor, a compressor having a cylinder and a casing rigid therewith, said casing directly secured to an end of said motor, the shaft of said motor extending into said casing, a drive element on said extended end of the shaft, and a driving connection between said drive element and the compressor, said motor having bearings for said shaft and said motor bearings taking wholly the thrusts of the compressor.

8. The combination of a commercial high-speed electric motor, a high speed compressor secured directly to an end of said motor, the piston of the compressor having an air passage and forming a valve seat, a flexible, pliable, metal, intake valve clamped firmly over a portion of the surface of said seat, and means to operate the compressor piston from the motor shaft, said means, said piston and said valve being directly responsive to the high speed of the motor.

9. The combination of a high-speed commercial electric motor, and a high speed compressor mounted on one end of said motor and including a piston having an air passage and a valve seat; together with means to drive said piston from said shaft at a high speed corresponding with the high speed of the motor, and an intake valve on the piston sensitively responsive to the high speed of the motor shaft and piston.

10. A compressor of the class described comprising a cylinder, a high speed compressing piston in said cylinder, and having an intake opening of large area relatively to the piston area, and a single disk valve of flexible, pliable metal secured approximately central of said piston and covering said opening at the front of the piston, said valve so thin and so sensitively responsive as to eliminate inertia and to be locally yieldable at all points about its fastened portion.

11. In a device of the class described, the combination with a high-speed commercial electric motor, of a high-speed compressor comprising a cylinder rigid with the motor as well as a piston operating in said cylinder; and a connecting rod directly connected with said piston and cranked to the motor shaft, the bearings for the shaft of the motor being on the motor and independent of said compressor cylinder and the thrust of said connecting rod being on said motor bearings, said cylinder being free from said thrust.

12. In a device of the class described, the combination of an electric motor, an air compressor associated with the motor at one end and including a cylinder and a piston therein; a crank pin on the motor shaft, and a connecting rod connected with said piston and with said crank pin, the armature of the motor functioning as a flywheel to the compressor and the bearings of the electric motor functioning as the bearings of the compressor.

13. In a device of the class described, the combination with an electric motor, of an air compressor having a casing, approximately centralizing with an end of the motor, a cylinder on said casing and open at one end to the latter, a piston in said cylinder, and a connecting rod secured at one end to said piston, the electric motor shaft extending into said compressor casing and having a crank connection with said connecting rod, the motor shaft terminating within said compressor casing, the bearing of the electric motor taking the pressure of said connecting rod.

14. In a device of the class described, the combination with a high speed motor; of a high-speed compressor comprising a cylinder as well as a piston operating in said cylinder, a high speed drive connection between the motor shaft and said piston, bearing means for said shaft independent of the compressor cylinder and receiving the thrust of said piston and drive means, said bearing means being disposed wholly on the motor and said cylinder being free from said thrust.

15. The combination with a high speed motor, its shaft and bearings; of a compressor pump cylinder, a casing on said cylinder rigid with said motor, a piston operating in said cylinder, and drive means to actuate said piston from said shaft, said piston directly responsive to the high motor speed and said cylinder and casing being free from thrust of said drive means, the thrust of said drive means being directly on said motor bearings.

16. A compressor comprising a cylinder, a high-speed reciprocating piston having an intake opening, and an intake valve of metal clamped in position on said piston over said opening and so thin as to practically eliminate inertia, said valve presenting a portion freely flexible to instantly respond to the high speed movements of the piston and pliable to be deformable and conform to irregularities presented by the valve seat.

17. In a device of the class described, the combination with a high-speed motor; of a high-speed compressor comprising a cylinder as well as a piston operating in said cylinder, a direct drive connection between the motor shaft and said piston, bearing means for said shaft independent of the compressor cylinder and receiving the thrust of said piston and drive means, said bearing means being disposed wholly on the motor and said cylinder being free from said thrust.

GREGORY JOHN SPOHRER.